US011214008B2

(12) United States Patent
Yamazaki et al.

(10) Patent No.: US 11,214,008 B2
(45) Date of Patent: Jan. 4, 2022

(54) THREE-DIMENSIONAL OBJECT FORMATION INSTRUCTION APPARATUS, THREE-DIMENSIONAL OBJECT PRODUCTION METHOD, AND PROGRAM

(71) Applicant: Jun Yamazaki, Tokyo (JP)

(72) Inventors: Jun Yamazaki, Tokyo (JP); Hikaru Kouta, Tokyo (JP); Norio Senda, Tokyo (JP); Shinji Nagashiro, Tokyo (JP); Ryota Koga, Tokyo (JP); Yuki Furukawa, Tokyo (JP)

(73) Assignee: Jun Yamazaki, Tokyo (JP)

( * ) Notice: Subject to any disclaimer, the term of this patent is extended or adjusted under 35 U.S.C. 154(b) by 0 days.

(21) Appl. No.: 16/341,028

(22) PCT Filed: Oct. 4, 2017

(86) PCT No.: PCT/JP2017/036167
§ 371 (c)(1),
(2) Date: Apr. 10, 2019

(87) PCT Pub. No.: WO2018/070322
PCT Pub. Date: Apr. 19, 2018

(65) Prior Publication Data
US 2019/0232567 A1 Aug. 1, 2019

(30) Foreign Application Priority Data

Oct. 11, 2016 (JP) .............................. JP2016-199955

(51) Int. Cl.
B29C 64/393 (2017.01)
G09B 23/12 (2006.01)
(Continued)

(52) U.S. Cl.
CPC .......... B29C 64/393 (2017.08); B29C 64/386 (2017.08); B33Y 10/00 (2014.12);
(Continued)

(58) Field of Classification Search
CPC . B29C 64/393; B29C 64/386; B29C 67/0088; B33Y 10/00; B33Y 30/00;
(Continued)

(56) References Cited

U.S. PATENT DOCUMENTS 5,409,379 A 4/1995 Montag et al.
5,480,305 A 1/1996 Montag et al.
(Continued)

FOREIGN PATENT DOCUMENTS

JP H02-085785 A 3/1990
JP H03-246772 A 11/1991
(Continued)

OTHER PUBLICATIONS

Jones, O.A. and Spencer, M.J., 2018. A simplified method for the 3D printing of molecular models for chemical education. Journal of Chemical Education, 95(1), pp. 88-96. (Year: 2018).*
(Continued)

Primary Examiner — Rocio Del Mar Perez-Velez
Assistant Examiner — Alicia M. Choi

(57) ABSTRACT

A three-dimensional object formation instruction apparatus receives information pertaining to distribution of a predetermined physical quantity in a three-dimensional space, and on the basis of the received information, determines a shape of a representation body representing the physical quantity, and then, on the basis of the received information, determines a position at which the representation body representing the physical quantity is to be arranged. The three-dimensional object formation instruction apparatus generates a three-dimensional object formation instruction including an instruction to form an object having the determined shape at the determined position, and outputs the generated instruction.

13 Claims, 6 Drawing Sheets

(51) Int. Cl.
  *G09B 23/20* (2006.01)
  *B33Y 10/00* (2015.01)
  *B33Y 30/00* (2015.01)
  *G09B 23/26* (2006.01)
  *B33Y 50/00* (2015.01)
  *B29C 64/386* (2017.01)
  *B33Y 50/02* (2015.01)

(52) U.S. Cl.
  CPC .............. *B33Y 30/00* (2014.12); *B33Y 50/00* (2014.12); *G09B 23/12* (2013.01); *G09B 23/20* (2013.01); *G09B 23/26* (2013.01); *B33Y 50/02* (2014.12)

(58) Field of Classification Search
  CPC ........ B33Y 50/00; B33Y 50/02; G09B 23/12; G09B 23/20; G09B 23/26
  USPC .......................................................... 700/98
  See application file for complete search history.

(56) References Cited

U.S. PATENT DOCUMENTS

| | | | |
|---|---|---|---|
| 5,598,359 A | 1/1997 | Montag et al. | |
| 5,630,718 A | 5/1997 | Montag et al. | |
| 5,926,401 A | 7/1999 | Montag et al. | |
| 7,853,069 B2* | 12/2010 | Katayama | G01N 23/046 345/419 |
| 2007/0253612 A1 | 11/2007 | Katayama et al. | |
| 2009/0148813 A1* | 6/2009 | Sun | A61K 6/891 433/201.1 |
| 2014/0336807 A1* | 11/2014 | Smith | G06F 30/00 700/98 |
| 2014/0370323 A1* | 12/2014 | Ackelid | B22F 3/1055 428/548 |
| 2015/0269289 A1* | 9/2015 | Kim | G06F 30/20 703/6 |
| 2017/0008085 A1* | 1/2017 | Nguyen | B22F 3/1055 |
| 2017/0066195 A1* | 3/2017 | Chu | B33Y 10/00 |
| 2018/0024517 A1* | 1/2018 | Halperin | G05B 19/4099 700/98 |
| 2018/0029297 A1* | 2/2018 | Morovic | G05B 19/4099 |
| 2018/0370117 A1* | 12/2018 | Gardiner | B29C 64/40 |
| 2019/0061349 A1* | 2/2019 | Kanaris | B41J 2/14145 |
| 2019/0282832 A1* | 9/2019 | Robar | B29C 64/106 |

FOREIGN PATENT DOCUMENTS

| | | |
|---|---|---|
| JP | H05-101150 A | 4/1993 |
| JP | H07-230480 A | 8/1995 |
| JP | H09-504388 A | 4/1997 |
| JP | 2003-131558 A | 5/2003 |
| JP | 2010-197419 A | 9/2010 |
| JP | 2012-133796 A | 7/2012 |
| JP | 2015-507092 A | 3/2015 |
| WO | 2001/077985 A1 | 10/2001 |

OTHER PUBLICATIONS

WIPO, International Search Report for PCT Patent Application No. PCT/JP2017/036167, dated Nov. 7, 2017.

WIPO, International Preliminary Report on Patentability for PCT Patent Application No. PCT/JP2017/036167, dated Nov. 7, 2017.

Jun Yamazaki, "3D Printer o Tsukatta Ne—Fe—B-kei Kaimen Kozo no Modeling", JSAP Spring Meeting Koen Yokoshu, Mar. 3, 2016, vol. 63rd, p. 01 to 117 (21a-P3-5), Japan (Cited in International Search Report for PCT/JP2017/036167.

Japan Patent Office, Office Action for Japanese Patent Application No. 2018-544973, dated Oct. 12, 2021.

* cited by examiner

FIG. 3

| Type of Physical Quantity | Shape of Representation Body |
|---|---|
| Scalar Quantity | Sphere |
| Vector Quantity | Circular Cone |

THREE-DIMENSIONAL OBJECT FORMATION INSTRUCTION APPARATUS, THREE-DIMENSIONAL OBJECT PRODUCTION METHOD, AND PROGRAM

TECHNICAL FIELD

The present disclosure relates to a three-dimensional object formation instruction apparatus, a three-dimensional object production method, and a program

BACKGROUND ART

Recently, a 3D printer which forms a three-dimensional object by depositing layers of a material, has become widely used. Patent Document 1 discloses an example of forming a three-dimensional structure for educational purposes such as a molecule model, by using such a 3D printer.

PRIOR ART

Patent Document

Patent Document 1: Japanese Unexamined Patent Publication (Kokai) No. 2010-197419

SUMMARY

Patent Document 1 discloses a technology which can schematically represent a real object, but the technology fails to provide a visual representation capable of encouraging physics-based understanding, such as existence probability distribution of electrons, density distribution of a physical quantity, and the like.

The present disclosure was made in view of the above, and one of the objectives of the present disclosure is to provide a three-dimensional object formation instruction apparatus capable of forming visual representation which can encourage physics-based understanding, a three-dimensional object production method, and a program.

An embodiment of the present disclosure to solve the drawbacks of the prior arts is a three-dimensional object formation instruction apparatus comprising: a receiving device which receives information pertaining to distribution of a predetermined physical quantity in the three-dimensional space, a shape determination device which determines a shape of a representation body representing the physical quantity, on the basis of the received information, a position determination device which determines a position where the representation body representing the physical quantity is to be arranged, on the basis of the received information, and a three-dimensional object formation instruction generating device which includes an instruction for forming an object having the determined shape at the determined position.

According to the present disclosure, a visual representation capable of encouraging physics-based understanding can be formed.

BRIEF DESCRIPTION OF DRAWINGS

FIG. 3 is an explanatory view showing an example of setting information held in a three-dimensional object formation instruction apparatus according to an embodiment of the present disclosure.

EMBODIMENT

Figure 1:
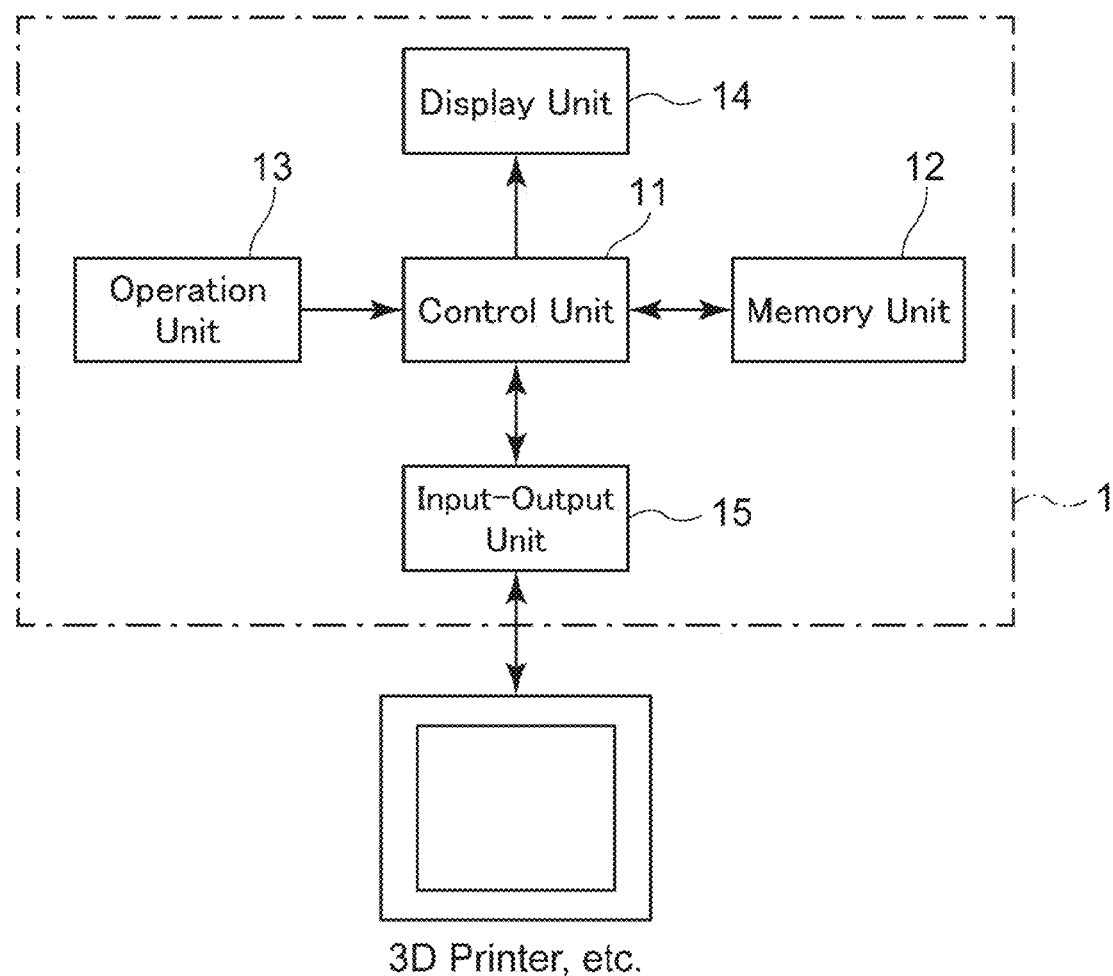
FIG. 1 is a block diagram showing a structural example of a three-dimensional object formation instruction apparatus according to an embodiment of the present disclosure.

An embodiment of the present disclosure will be explained with reference to the drawings. As shown in FIG. 1 as an example, a three-dimensional object formation instruction apparatus according to an embodiment of the present disclosure includes a control unit 11, a memory unit 12, an operation unit 13, a display unit 14, and an input-output unit 15. The control unit 11 is a program-controlled device such as a CPU, and operates in accordance with a program stored in the memory unit 12.

According to the present embodiment, the control unit 11 receives information pertaining to distribution of a predetermined physical quantity in a three-dimensional space, and, on the basis of the received information, determines a shape of a representation body which represents the physical quantity. Then, the control unit 11 determines a position where the representation body representing the physical quantity is to be arranged, on the basis of the received information, and generates and outputs a three-dimensional object formation instruction which includes an instruction to form an object having the determined shape at the determined position. The operations of the control unit 11 will be described in detail below.

The memory unit 12 includes a disk device, a memory device, etc., which stores a program to be executed by the control unit 11. The program may be provided by being stored in a non-transitory computer-readable medium, and then, stored in the memory unit 12. The memory unit 12 may also operates as a work memory of the control unit 11.

The operation unit 13 is a mouse, a keyboard, etc., which receives an instruction operation of a user, and outputs information representing the content of the instruction operation to the control unit 11. The display unit 14 is a display, etc., which displays information, in response to the instruction input from the control unit 11.

The input-output unit 15 includes a network interface, an USB (Universal Serial Bus) interface, etc. In accordance with the instruction input from the control unit 11, the input-output unit 15 outputs information to an external apparatus (for example, 3D printer, etc.) Further, the input-output unit 15 receives information from an external computer, etc., and outputs the received information to the control unit 11. According to an example of the present embodiment, the input-output unit 15 receives information pertaining to distribution of a predetermined physical quantity in the three-dimensional space, from an external computer (simulator, etc.), and outputs the received information to the control unit 11.

Figure 2:
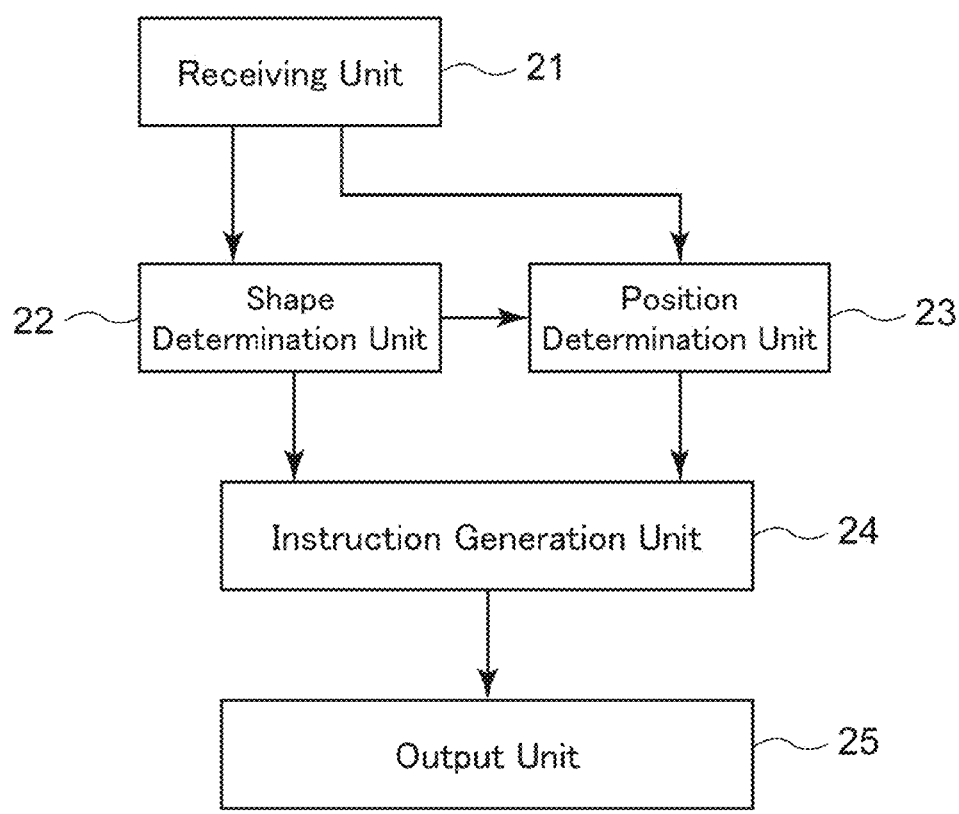
FIG. 2 is a functional block diagram showing an example of a three-dimensional object formation instruction apparatus according to an embodiment of the present disclosure.

Next, operations of the control unit 11 will be explained. According to an example of the present embodiment, as exemplified in FIG. 2, the control unit 11 functionally comprises a receiving unit 21, a shape determination unit 22, a position determination unit 23, an instruction generation unit 24, and an output unit 25.

The receiving unit 21 receives information pertaining to distribution of a predetermined physical quantity in the three-dimensional space. Here, examples of the information pertaining to distribution of physical quantity includes information on an electron density distribution calculated for an atom or a molecule, information on the angular momentum (spin) of an electronic field, information relating to distribution of electrical flux lines or magnetic field lines, information relating to flow rate distribution of a fluid, information on pressure or distortion, temperature, energy, etc., a quantity in a field in a n-dimensional space, and the like, which are represented in the three-dimensional space.

On the basis of the information received by the receiving unit 21, the shape determination unit 22 determines the shape of a representation body which represents a physical quantity, the distribution of the physical quantity being represented by the received information. Here, the representation body is an object having a three-dimensional shape such as a sphere, a circular cone, etc., formed by a 3D printer. The shape determination unit 22 determines a three-dimensional shape to represent the physical quantity.

Specifically, the shape determination unit 22 relates each type of the physical quantity with a corresponding shape of the representation body, in accordance with the type of the physical quantity, determines the relationship in advance as exemplified in FIG. 3, and stores the relationship in the memory unit 12. Here, the type of physical quantity is indicated by the difference between the scalar quantity and the vector quantity (difference between the quantity with a direction and the quantity without a direction), the possibility whether the quantity can be represented by a line segment or not, and the like. In FIG. 3, in case of a scalar quantity, the shape of the representation body is a sphere, whereas, in case of a vector quantity, the shape of the representation body is a shape capable of indicating a direction (for example, circular cone). The present embodiment is not limited thereto. The instruction may be that the shape of a representation body for a vector quantity is a sphere, and the radius of the sphere corresponds to the magnitude of the vector quantity.

According to the example shown in FIG. 3, on the basis of the information received by the receiving unit 21, the shape determination unit 22 determines whether the physical quantity, the distribution of which is represented by the information, is a scalar quantity or a vector quantity. When the physical quantity is a scalar quantity, the shape determination unit 22 determines the shape of a representation body as "sphere". Whereas, when the physical quantity, the distribution of which is represented by the information received by the receiving unit 21, is a vector quantity, the shape determination unit 22 determines the shape of a representation body as "circular cone".

In the above, the types of the physical quantity are divided between the scalar quantity and the vector quantity. However, in the present embodiment, the types of the physical quantity causing the difference in the shapes of the representation body are not limited thereto. For example, a physical quantity representing the distribution of water drops may correspond to a teardrop shape, while a physical quantity representing gas distribution may correspond to a sphere. Other than those above, the representation body may have a different shape corresponding to a type of a material for the distribution.

On the basis of the information received by the receiving unit 21, the position determination unit 23 determines a position where the representation body representing the physical quantity, the distribution of which is represented by the information, is to be arranged. Specifically, the position determination unit 23 determines a position where the representation body is to be arranged, within a representation space representing at least a part of the three-dimensional space represented by the received information. Here, the representation space is a three-dimensional space formed by increasing or decreasing the size of the three-dimensional space represented by the received information, at a scale or an aspect ratio determined in advance or designated by a user, and is a space formed by a 3D printer, etc. (accordingly, the space has a size which can formed by a 3D printer, etc.) The position determination unit 23 determines a representation body locating position by a set of coordinates.

As an example, the position determination unit 23 divides the representation space into predetermined small spaces, and determines the number of representation bodies to be arranged, for each small space. Namely, the position determination unit 23 divides a cuboid-shaped representation space defined from (xmin, ymin, zmin) to (xmax, ymax, zmax) into cube-shaped small spaces, having a size of axaxa, and defined from (xi, yj, zk) (wherein, i=1, 2, . . . , j=1, 2, . . . , k=1, 2, to (xi+a, yj+a, zk+a). Hereinbelow, a small space from (xi, yj, zk) (wherein, i=1, 2, . . . , j=1, 2, . . . , k=1, 2, to (xi+a, yj+a, zk+a) is referred to as B(i, j, k).

The position determination unit 23 specifies an area within the three-dimensional space represented by the information received by the receiving unit 21, and corresponding to each small space B(i, j, k) (wherein, i=1, 2, . . . , j=1, 2, . . . , k=1, 2, and calculates a value of a physical quantity represented by the information received by the receiving unit 21, within the specified area. A statistical value is an average value, a maximum value, a minimum value, a median value, a variance value, etc., and the value is to be used may be previously designated by a user. In the present embodiment, the statistical value represents an arrangement density of a representation body in each small space B.

The position determination unit 23 previously receives, from a user, designation of the minimum size Lmin=(Δx, Δy, Δz) of an object having a shape determined by the shape determination unit 22, which can be formed by a 3D printer, and designation of the minimum gap G between the representation bodies; and calculates the maximum value ΔL=max(Δx, Δy, Δz) among the components of the minimum size. Here, max(α, β, γ) represents the largest value among α, β, and γ.

The position determination unit 23 uses the size a of the small space, the information ΔL calculated regarding the minimum size, and the gap G between the representation bodies, to calculate the maximum number M of representation bodies to be arranged in one small space by, for example, $M = a/(\Delta L + G)$ (corresponding to maximum number which can be arranged with the gap G therebetween). Further, M can be obtained by subtracting the gap G from the length a of one side, that is, by:

$M = (A - G)/(\Delta L + G)$.

With this M, the representation body is located at a position at least G/2 apart from each face of the small space, so that the gap between the representation body arranged in a small space and the representation body arranged in an adjacent small space can be prevented from being less than the gap G.

The position determination unit 23 refers to the maximum value Pmax of the statistical value of the physical quantity in the area corresponding to the small space within the three-dimensional space, the value having been calculated for each small space in advance, and obtains a representation ratio r=M/Pmax. Then, with respect to each small space B(i, j, k), the position determination unit 23 multiplies the statistical value P of the physical quantity in the area corresponding to the small space B(i, j, k) within the three-dimensional space by the representation ratio r, to obtain the number of representation bodies R(i, j, k)=r×P to be arranged in the relevant small space B(i, j, k).

According to an example of the present embodiment, the obtained number of representation bodies R may be further modified by a user's instruction. For example, with respect to a three-dimensional object formed according to an instruction generated by the three-dimensional object formation instruction apparatus 1, if a user feels the number of representation bodies is too large (too small) as a whole, the user operates the operation unit 13 to input a modification ratio w. As the modification ratio, a positive number of less than 1 is to be input to reduce the number of representation bodies, and a positive number larger than 1 is to be input to increase the number of representation bodies.

In response to the input of the modification ratio w, the position determination unit 23 modifies the previously calculated number R of the representation bodies to R'(i, j, k)=w×R(i, j, k).

In the above example, after the number of representation bodies is calculated, the calculated number of representation bodies is modified. However, instead thereof, or in addition thereto, the maximum number M may be modified by multiplying the maximum number M by the modification ratio w, and the like, to thereby obtain the number of representation bodies on the basis of the modified maximum number.

The position determination unit 23 arranges R(i, j, k) pieces (when R(i, j, k) is modified by the modification ratio w, R'(i, j, k) pieces) of representation bodies within each small space B(i, j, k) while preventing the pieces from overlapping. Specific arrangement position of each representation body may be determined at random within the small space B(i, j, k), or may be determined by a method used for, for example, a dynamic model for drawing a graph, wherein, while the distribution of the distances from the center of the small space to the gravity centers of the representation bodies is made as small as possible, the positions the representation bodies are determined by using a recursive process so that the representation bodies do not overlap with each other. Further, in another example, R(i, j, k) pieces (when modified by the modification ratio w, R' (i, j, k) pieces) of grid points may be arranged in the small space B(i, j, k) and the representation bodies may be arranged on the grid points (such that, for example, the gravity center of the representation body is placed on the grid point). Here, the grid points may be set by calculating the cubic root of the R(i, j, k) pieces (when modified by the modification ratio w, R'(i, j, k) pieces), obtaining a integer T closest to the calculated result, and setting T×T×T pieces of grid points at even intervals within the small space B(i, j, k).

In case of the arrangement at random, not only the uniform random number, but also a random function according to a predetermined distribution, may be used for determination at random. Here, the distribution may be an exponential distribution (when an inverse function method is used, a random number value obtained by R=−(1/Δ)log[1−Rd] (wherein, λ is a parameter which can be experimentally determined, Rd is a random number generated by an uniform random number function, R is a random number to be output)), Gaussian distribution, Poisson distribution, and the like. Accordingly, when random numbers other than the uniform random numbers are used, distribution densities of the representation bodies become different depending on the positions in the small space, and thus, in some conditions, visibility may be increased.

The instruction generation unit 24 generates a three-dimensional object formation instruction which includes an instruction to form an object having a shape determined by the shape determination unit 22, at a position determined by the position determination unit 23. The three-dimensional object formation instruction according to the present embodiment may be described by the STL (Standard Triangulated Language) format which represents a three-dimensional body by polygon mesh. However, in the present embodiment, each representation body is independently present in the space, and thus, an instruction to fill a part of the space where representation bodies are not arranged, with a translucent material, such as a transparent resin, etc., is included. The translucent material may be filled in the entirety of the remaining area where the representation bodies are not arranged, in the representation space, or may be filled in only a part of the remaining area (for example, to an extent capable of supporting each representation body, such that the bottom face and from the bottom face to a lower part of each representation body, etc.) The output unit 25 outputs the three-dimensional object formation instruction generated by the instruction generation unit 24, through the input-output unit 15, to a 3D printer, etc.

Operation Example

The three-dimensional object formation instruction apparatus 1 according to the present embodiment basically comprise the above structure, and operates as follows. Hereinbelow, the information pertaining to the distribution of physical quantity is information pertaining to the distribution of electron density calculated for an atom or a molecule.

Figure 4:
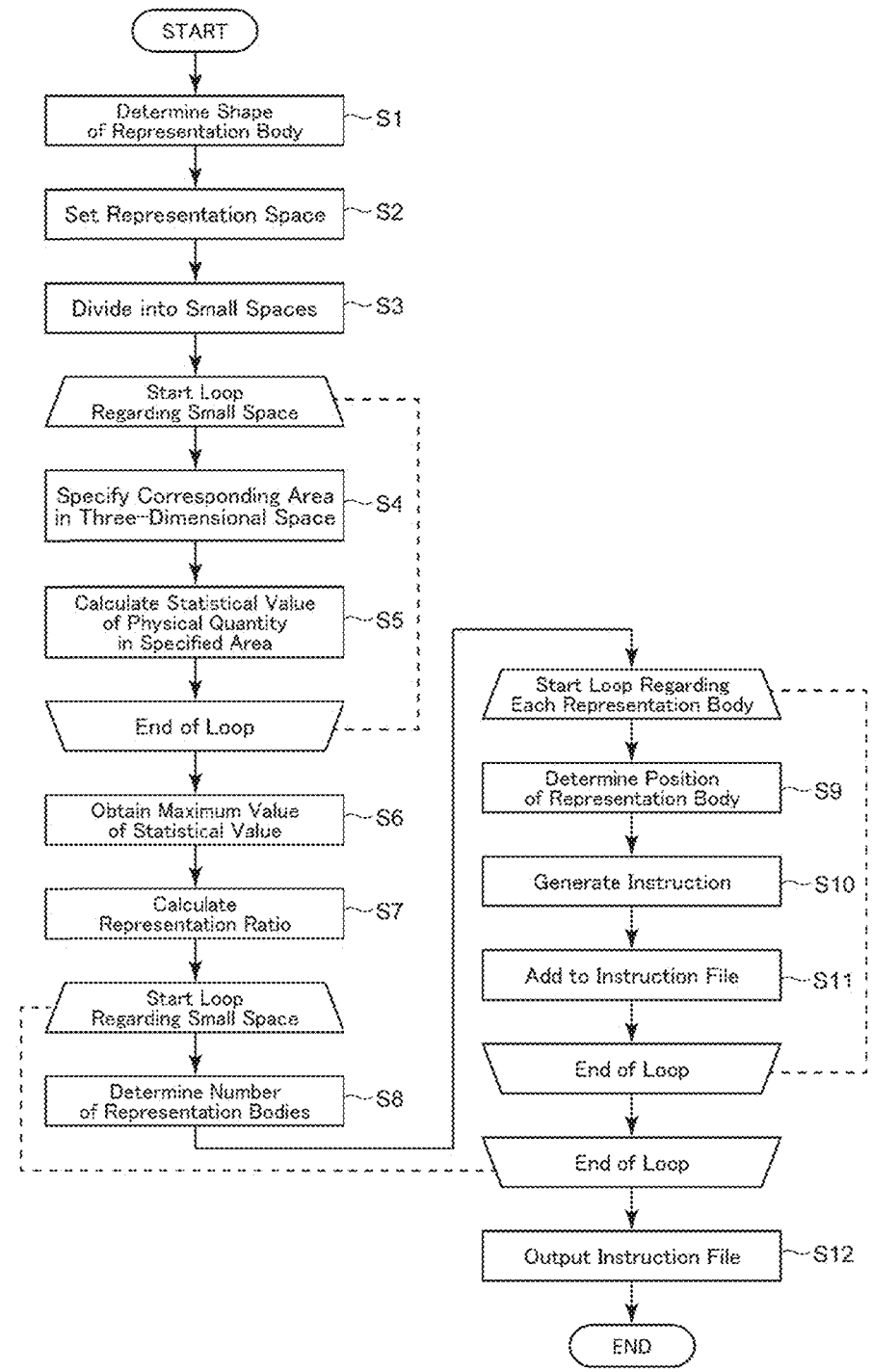
FIG. 4 is a flowchart showing an operation example of a three-dimensional object formation instruction apparatus according to an embodiment of the present disclosure.

The three-dimensional object formation instruction apparatus 1 receives information regarding electron density distribution within a three-dimensional space calculated for an atom or a molecule, initializes an instruction file (generates an empty file) to be output, and initiates a process exemplified in FIG. 4.

On the basis of the received information, the three-dimensional object formation instruction apparatus 1 determines the shape of a representation body which represents the physical quantity, the distribution of which is represented by the information (S1). Here, the electron density distribution represents an existence probability of electron at each position in the three-dimensional space, and is a scalar quantity. Thus, the three-dimensional object formation instruction apparatus 1 determines the shape of the representation body as "sphere".

Next, the three-dimensional object formation instruction apparatus 1 determines the shape and the size of an area (representation space) for representing the three-dimensional space represented by the received information (S2). The shape of the representation space may be, byway of example, a hexahedron such as a cuboid, etc. The size of the representation space may be the maximum size that can be formed by the connected 3D printer, or may be appropriately set by a user. The three-dimensional object formation instruction apparatus 1 divides the representation space having a size determined by Step S2, i.e., for example, a cuboid-shaped area from (xmin, ymin, zmin) to (xmax, ymax, zmax), into small spaces B(i, j, k) (S3). Here, the small space B(i, j, k) has a cubic shape defined from (xi, yj, zk) (wherein, i=1, 2, ... Nx, j=1, 2, ... Ny, k=1, 2, ... Nz) to (xi+a, yj+a, zk+a), and having a size of a×a. Here, x1=xmin and xNx+a=xmax are satisfied. Also, y1=ymin and yNy+a=ymax are satisfied, and z1=zmin and zNz+a=zmax are satisfied. All of Nx, Ny, Nz are natural numbers of "2" or more, respectively.

With respect to each small space B(i, j, k) (wherein, i=1, 2, ..., j=1, 2, ..., k=1, 2, ...), the three-dimensional object formation instruction apparatus 1 specifies an area corresponding to the small space B, within the three-dimensional space represented by the received information (S4); and, within the specified area, calculates a statistical value of the physical quantity represented by the received information (S5), the calculated value being arrangement density information of the representation body in the corresponding small space B. Here, the distribution information of the physical quantity is distribution information of electron densities calculated for an atom or a molecule, and thus, an average value of electron densities in the area specified in Step S4 is calculated. The three-dimensional object formation instruction apparatus 1 repeatedly executes Step S4 and Step S5 for the small spaces B, respectively.

Further, the three-dimensional object formation instruction apparatus 1 retrieves the maximum value Pmax from the average values of electron densities (arrangement densities in this case) calculated for the respective small spaces B(i, j, k) (S6). The three-dimensional object formation instruction apparatus 1 obtains the maximum number M of the representation bodies to be arranged in the small space B, on the basis of the minimum size Lmin=($\Delta$x, $\Delta$y, $\Delta$z) of the shape determined in Step S1 that can be realized by the connected 3D printer, the minimum gap G (predetermined) between the representation bodies, and the size a of the small space B. The three-dimensional object formation instruction apparatus 1 calculates a representation ratio r=M/Pmax, using the maximum value Pmax of the statistical value of the physical quantity calculated in Step S6, and the maximum number M (S7). Then, with respect to each small space B(i, j, k), the three-dimensional object formation instruction apparatus 1 multiplies the statistical value P of the physical quantity in the area within the three-dimensional space corresponding to the small space B(i, j, k) by the representation ratio r, to obtain the number R(i, j, k)=r×P of the representation bodies to be arranged in the small space B(i, j, k) (S8).

The three-dimensional object formation instruction apparatus 1 determines coordinate information S(xm, ym, zm) (m=1, 2, ... R(i, j, k)) indicating the arrangement positions of the R(i, j, k) pieces of representation bodies in the small space B(i, j, k), the pieces being arranged so as not to overlap with each other (S9). Specifically, R(i, j, k) pieces of coordinate information S(xm, ym, zm) (m=1, 2, ... R(i, j, k)) within the area of the small space B(i, j, k) are determined as random values which do not overlap with each other (in this case, the shape of the representation body is sphere, and thus, the positions that the coordinates represent are separated with each other at least at a distance obtained by adding the radius of the sphere and the minimum gap G).

The three-dimensional object formation instruction apparatus 1 generates an instruction (an instruction according to STL format) to arrange the object having the shape determined in Step S1 at the position defined by each piece of coordinate information determined in Step S9 (here, the shape determined in Step S1 is "sphere", and thus, the coordinate information may be treated as indicating the center of the sphere) (S10); and adds the generated instruction to an instruction file to be output (S11).

The three-dimensional object formation instruction apparatus 1 repeatedly executes from Step S8 to Step S11 regarding each small space B, and obtains an instruction file to be output. Then, the three-dimensional object formation instruction apparatus 1 further includes, in the obtained instruction file, an instruction instructing that a translucent material should be filled in an area where no object is arranged in the representation space, and outputs the resulting instruction file to the connected 3D printer (S12).

By this process, a three-dimensional object having the shape of the representation space is formed. In the three-dimensional object, the status that the representation bodies are arranged on the basis of the input information regarding distribution of electron densities in the three-dimensional space, calculated for the atom or molecule, can be visually recognized from various directions of the representation space (for example, when the representation space is a hexahedron, from the directions of respective faces), through the area formed by the translucent material. When the three-dimensional object having representation bodies arranged in the translucent material, is formed, uneven surfaces are polished. Thereby, the representation bodies can become more clearly visible.

The process can be applied for representing a physical quantity having a scalar quantity. Other than the example stated above, the process can be applied to the information of physical quantity relating to a flow rate distribution of a fluid. Examples of the fluid may include liquid (seawater, river water, blood, etc.), gas (air flow, gas flow), powder, elementary particles, etc.

Example of the Case of Vector Quantity

Further, when the information received by the three-dimensional object formation instruction apparatus 1 is information of a vector quantity, the shape to be determined by the three-dimensional object formation instruction apparatus 1 in Step S1 of FIG. 4 is, for example, a circular cone. In this example, in Step S10, the coordinate information S indicating the position of each representation body, as well as the direction of the circular cone (the direction from the bottom face to the vertex), are determined on the basis of the received information.

The determination of the direction may be preformed by obtaining the direction of the vector quantity indicated by the received information, at the position indicated by the coordinate information S, with respect to each piece of the determined coordinate information S. For example, if, in the received information relating to the physical quantity, the direction of the vector quantity is represented by a function of position, the value of the function (vector quantity) may be obtained.

In this example, for example, when the information received by the three-dimensional object formation instruction apparatus 1 is information relating to distribution of electrical flux lines or magnetic field lines, circular cone-shaped representation bodies are arranged in each small space set within the representation space, the number of the circular cone-shaped representation bodies being corresponding to the average of intensities of the electrical flux lines or the magnetic lines in the area corresponding to the relevant small space within the three-dimensional space, and each representation body being arranged with its vertex oriented to the direction of the electrical flux line or the magnetic field line at the position of the representation body.

Further, according to the present example, the coordinate information is determined in a way that the coordinate information indicates the center of a circle defining the bottom face of the circular cone, and the coordinate information does not cause overlapping so that the distance between cuboids circumscribing the respective circular cone-shaped representation bodies is the distance G or more.

Example Wherein Density is not Used

Further, when the vector quantity information is represented, instead of the representation using the arrangement density, an instruction for forming a three-dimensional object may be generated as described below.

Namely, according to another example of the present embodiment, the control unit 11 receives an input of a function representing a vector field such as an electric field, a magnetic field, etc., as information pertaining to distribution of a predetermined physical quantity, in the three-dimensional space. This function takes coordinates in the three-dimensional space as parameters, and represents the magnitude and direction of the vector at the coordinates.

The control unit 11 determines the shape of the representation body representing the physical quantity represented by the information. Here, the information represents a vector (a set of a plurality of numerical values), and thus, the control unit 11 selects a shape capable of indicating a direction, such as a circular cone, etc.

On the basis of the received information, the control unit 11 obtains a virtual streamline within the three-dimensional space corresponding to the representation space, using a widely known method for drawing streamlines. Then, control unit 11 generates directed segments by dividing into a plurality of parts along the obtained streamline. If a plurality of directed segments along the streamline can be directly generated on the basis of the received information, the method (for example, a method same as the StreamPlot function in Mathematica (registered trademark) of Wolfram Research) may be used.

The control unit 11 generates a three-dimensional object formation instruction to arrange a circular cone for each of the generated directed segments, each circular cone having a size of the directed segment, and the direction from the center of the bottom face to the vertex of the circular cone being directed along the directed segment; includes the generated instruction in the instruction file to be output; and outputs the instruction file to the 3D printer.

Also in this example, the control unit 11 includes, in the instruction file, an instruction that a translucent material should be filled in areas where no objects are arranged. According to these processes, a three-dimensional object in which circular cones are arranged along the streamline, can be formed.

Example Including Information of Other Tangible Object

According to the present embodiment, the three-dimensional object formation instruction apparatus 1 may further receive information pertaining to the shape of a tangible object (referred to as a background object), the tangible object being different from the object representing the physical quantity and arranged in the three-dimensional space of the information pertaining to the physical quantity, and on the basis of the received information pertaining to the shape of the background object, the three-dimensional object formation instruction apparatus 1 may generate a three-dimensional object formation instruction which further includes an instruction for forming the shape of the background object.

Specifically, when the three-dimensional object formation instruction apparatus 1 receives information representing the distribution of water-vapor content in the atmosphere in a certain region, as information pertaining to the distribution of a physical quantity in the three-dimensional space, in addition, the three-dimensional object formation instruction apparatus 1 also receives, for example, information representing the landscape of the region in the three-dimensional space, as shape information of the background object.

Then, the three-dimensional object formation instruction apparatus 1 generates an instruction to form a background object represented by the received shape information, in an area within the representation space corresponding to the landscape, in the three-dimensional space. Further, the three-dimensional object formation instruction apparatus 1 generates an instruction to determine the shape and the coordinate position of the representation body representing the distribution of the physical quantity, and to form the representation body within the representation space. Then, the three-dimensional object formation instruction apparatus 1 generates an instruction file including the generated background object formation instruction and the representation body formation instruction, and outputs the instruction file to the 3D printer.

Also in this example, the control unit 11 includes, in the instruction file, an instruction to fill a translucent material in areas where neither the representation bodies nor the background object are arranged.

Further, in this example, in an area occupied by the background object in the three-dimensional space at least partly overlaps the arrangement area of the representation body, the control unit 11 deletes the representation body, or deletes apart of the representation body, i.e., only the overlapping part (in terms of the three-dimensional model processing, a processing referred to as Boolean operation is performed, wherein the difference by subtracting the three-dimensional model of the background object from the three-dimensional model of the representation body is used for modifying the three-dimensional model of the representation body).

According to this example, changes of the water-vapor content distribution in the atmosphere, relative to the landscape, an be visualized.

Example of Changing Colors

In the above explanation, the control unit 11 receives information pertaining to distribution of a predetermined physical quantity in the three-dimensional space, and on the basis of the received information, the control unit 11 determines the shape of the representation body representing the physical quantity. However, the control unit 11 may further determine the color of the representation body.

For example, the control unit 11 may make the colors of representation bodies different, depending on the magnitude of the physical quantity. In this case, the control unit 11, as an operation of an instruction generation unit 24, generates a three-dimensional object formation instruction which includes an instruction to form an object having a shape determined by the shape determination unit 22, at a position determined by the position determination unit 23, with respect to each color to be used.

Also in this example, the three-dimensional object formation instruction for each color is described in STL format, and includes an instruction to fill a translucent material, such as a transparent resin, etc., in the part where no representation bodies are arranged.

The output unit 25 outputs the three-dimensional object formation instruction relating to the representation body of each color, which is generated by an operation of the instruction generation unit 24, through the input-output unit 15 to the 3D printer, etc.

Further, the control unit 11 may generate an instruction for forming a plurality of types of representation bodies which represent a plurality of types of physical quantities, respectively. In this case, the control unit 11 may generate an instruction by which the representation bodies corresponding to mutually different types of physical quantities, are to be colored in mutually different colors.

[Formation of Hollow]

Here, regarding the three-dimensional object formation instruction for each color, in case that the control unit 11 includes an instruction to fill a translucent material such as a transparent resin, etc., in a part where no representation bodies are arranged, the control unit 11 makes the three-dimensional object formation instruction for a certain color (referred to as a noted color) such that the areas (three-dimensional area) where representation bodies other than those of the noted color are to be arranged should be made hollow in which the translucent material is not filled (i.e., the space where nothing is formed). Accordingly, with respect to the instruction relating to a material of a certain color, the instruction is set so that the area in the three-dimensional space in which a color material other than the certain color is to be filled, should be made hollow. Thereby, in the subsequent step, when the 3D printer is controlled by this instruction, excessive deposition of two or more material within a certain area (deposition of materials having a volume larger than the volume of the area) can be prevented, leading to preventing drawbacks in the resulting product.

[Another Example of Small Space]

In the above explanation, the small space obtained by dividing the representation space is a cuboid from (xmin, ymin, zmin) to (xmax, ymax, zmax), but the present embodiment is not limited thereto. According to an example of the present embodiment, the small space may be obtained by dividing the representation space according to the polar coordinate system (r, θ, φ), the representation space being divided in the radial direction (r direction) by a unit of $\Delta r$, in the polar angle θ direction by a unit of $r \cdot \Delta \theta$, and in the azimuthal angle φ direction by a unit of $r \cdot \sin \theta \cdot \Delta \varphi$. Also, the small space may be obtained by dividing the representation space according to the cylindrical coordinate system (r, θ, z), the representation space being divided in the radial direction (r direction) by a unit of $\Delta r$, in the polar angle θ direction by a unit of $r \cdot \Delta \theta$, and in the height direction (z-axis direction) by a unit of $\Delta z$.

Further, in the present embodiment, the shape of the small space may be arbitrarily set by a user.

As mentioned above, when a small space according to a coordinate system other than the x, y, z orthogonal coordinate system is used, a hexahedron circumscribing each small space B(i, j, k) is arranged so that each side thereof matches with either of the x-axis, y-axis, or z-axis, the length of the minimum side among the sides of each hexahedron is defined as a(i, j, k), and the minimum value of a(i, j, k) (wherein, i=1, 2, . . . , j=1, 2, . . . , k=1, 2, . . . ) is defined as the size a of the small space.

Even if the small space has a shape other than the cuboid (the shape defined by a coordinate system other than the x, y, z orthogonal coordinate system), the representation body to be arranged has a shape represented by the x, y, z orthogonal coordinate system. Thus, the instruction file to be generated includes an instruction represented by the x, y, z orthogonal coordinate system.

Another Example of Representation Body Arrangement

With respect to the arrangement method of the representation bodies, according to the above explanation, the representation space is divided into small spaces, and the number of representation bodies arranged in the small space is determined on the basis of the statistical value of the physical quantity in the small space. However, the present embodiment is not limited thereto.

According to an example of the present embodiment, the control unit 11 calculates the statistical values of the physical quantity for respective small spaces, and thereafter, classifies the statistical values of the small spaces into Nb bins (value range) b1, b2, . . . bNb. Then, the control unit 11 labels the small space on the basis of the bin to which the statistical value of the physical quantity regarding the relevant small space belongs. Specifically, with respect to each small space B(i, j, k), when the statistical value of the physical quantity for the small space B(i, j, k) belongs to a bin bq (any of q=1, 2 . . . Nb), the information specifying the small space B(i, j, k) and the information specifying the bin are related, and stored in the memory unit 12.

The control unit 11 uses the size a of the small space, the minimum size Lmin=($\Delta x$, $\Delta y$, $\Delta z$) of the object having the determined shape, and the minimum gap G between the representation bodies, to calculate the maximum value $\Delta L$=max ($\Delta x$, $\Delta y$, $\Delta z$) among the components of the minimum size; and uses the size a of the small space, the information $\Delta L$ regarding the minimum size calculated as above, and the minimum gap G between the representation bodies, to calculate the maximum number M of the representation bodies to be arranged in the small space as, for example, $$M=a/(\Delta L+G).$$

Then, with reference to the previously recorded information, the control unit 11 obtains, with respect to each bin bq(q=1, 2, . . . Nb), the statistical value range information Pmid_q(q=1, 2, . . . Nb) (for example, the median value of the range) of the bin bq. Further, with respect to the statistical value range information Pmid_q of each bin bq, the maximum value Pmax is obtained. The control unit 11 also obtains the representation ratio r=M/Pmax.

Next, with respect to each bin bq, the control unit 11 obtains the number R(i, j, k) of the representation bodies to be arranged in the small space B(i, j, k) which is specified by the information recorded in relation to the information specifying the bin bq, as $$R(i,j,k)=r \times Pmid\_q.$$

Then, with respect to each small space B(i, j, k), the control unit 11 determines the coordinate information S(xm, ym, zm) (m=1, 2, . . . R(i, j, k)) indicating the arrangement positions of the R(i, j, k) pieces of representation bodies within the small space B(i, j, k), under the conditions that the representation bodies do not overlap with each other; generates an instruction (instruction according to the STL format) to arrange the object having a previously determined shape at the position indicated by the determined coordinate information; and adds the instruction to the instruction file to be output.

According to this example, the number of representation bodies in each small space becomes the same in the same bin, and thus, among the small spaces within a substantially equivalent range (range of bin), the number of representation bodies in the small space becomes the same, leading to increasing the visibility.

[Curved Isosurface Formation Instruction]

According to an example of the present embodiment, instead of arranging the representation body, or in addition to arranging the representation body, a surface defined by positions having the same value of the physical quantity may be formed, on the basis of the input information pertaining to the distribution of physical quantity determined in the three-dimensional space. For example, the formation of this surface is performed as below.

Namely, the three-dimensional object formation instruction apparatus 1 receives, from a user, an instruction specifying the value at which the surface is to be formed, as parameter information relating to the curved isosurface. This instruction may be an instruction for forming a surface of a value close to a predetermined statistical value, such as an instruction for "forming a surface of the maximum value", an instruction for "forming a surface of the minimum value", an instruction for "forming a surface of the average value", or the like, or may be an instruction for forming, in response to the designation of a value, a surface of a value close to the designated value (the absolute value of the difference from the designated value being lower than a predetermined threshold value).

The three-dimensional object formation instruction apparatus 1 determines the size of the area (representation space) for representing the three-dimensional space represented by the input information, and divides the area into small spaces B(i, j, k). The step is the same as the above-mentioned example, and thus, the explanation therefor is not repeated here.

With respect to each small space B (i, j, k) (wherein, i=1, 2, ..., j=1, 2, ..., k=1, 2, ... ), the three-dimensional object formation instruction apparatus 1 specifies an area corresponding to the small space B, in the three-dimensional space represented by the received information, and calculates the statistical value of the physical quantity represented by the received information within the specified area (when the physical quantity is a vector quantity, a statistical value such as a magnitude thereof, may be used.)

Further, the three-dimensional object formation instruction apparatus 1 refers to information specifying the designated surface to be formed, and specifies a small space B(i, j, k) from among the small spaces B(i, j, k), so that the statistical value calculated for the specified small space B(i, j, k) is a value specified by the information or a value within a predetermined range from the relevant value (the predetermined range being a range that the absolute value of the difference from the relevant value is lower than a predetermined threshold value).

The three-dimensional object formation instruction apparatus 1 uses the coordinates of the center point of the specified small space B(i, j, k) to generate information representing a three-dimensional surface by triangular meshes, by a widely known triangle division method such as Delaunay triangulation.

The three-dimensional object formation instruction apparatus 1 generates an instruction for forming respective faces of the triangle included in the generated information, and adds the generated instruction in the instruction file to be output.

When the 3D printer forms a three-dimensional object on the basis of the instruction file generated according to this example of the present embodiment, an isosurface of the instructed value is formed and visualized. Thus, the spatial distribution of the surface having the same value of the physical quantity can be more easily understood.

Further, in another example, a small space B(i, j, k) is specified from among the small spaces B(i, j, k), so that the statistical value calculated for the specified small space B(i, j, k) is a value specified by the information designated by a user for specifying the surface to be formed, or a value within a predetermined range from the relevant value (the predetermined range being a range that the absolute value of the difference from the relevant value is lower than a threshold value). Thereafter, instead of generating an instruction for forming a three-dimensional surface, an instruction file may be generated to include an instruction by which the small space B(i, j, k) is treated as a target small space, only the target small space is subjected to the processes in Step 4 and thereafter shown in FIG. 4, and representation bodies are generated only in the target small space.

[Division of Instruction File]

According to the present embodiment, the control unit 11 may divide the generated instruction file into two or more different instruction files (referred to as divisional instruction files), and output each divisional instruction file to the 3D printer to form a three-dimensional object with regard to each divisional instruction file. Specifically, the control unit 11 cuts the generated instruction file at a plane instructed by a user to generate two divisional instruction files. Here, the instruction regarding the plane may be, for example, an instruction to cut at the plane of z=ζ, and the like.

Thereby, for example, with respect to an instruction file which represents existence probability distribution of electrons in the s-orbital of a certain atom, two divisional instruction files are generated by the cut at the plane passing through the center of the atomic nucleus of the atom, and two three-dimensional objects corresponding to the respective divisional instruction files are obtained. By arranging these two three-dimensional objects in a way that the surfaces corresponding to the cut plane are matched with each other, the entirety of the existence probability distribution of the electrons in the s-orbital of the atom can be observed. Further, when these three-dimensional objects are separated, and observed from the surface corresponding to the cut plane, how the existence probability distributions of the electrons spread around the atomic nucleus can be observed.

[Partial Formation of Background Object]

According to the present embodiment, designation of a range in which a background object is to be formed, may be received from a user, and an instruction to form only a part of the background object included in the formation range, may be included in the instruction file.

[Posttreatment for UV Burn]

With respect to the three-dimensional object formed by the 3D printer, etc., on the basis of the instruction file generated according to the present embodiment, if a step for irradiating ultra violet light is included in the formation process by the 3D printer, a treatment to reduce a problem referred to as ultra-violet burns (UV burns) may be applied. There are widely known methods for the treatment, and any method may be adopted.

[Considering Deposition Direction]

Generally, in the 3D printer to which the instruction file generated by the three-dimensional object formation instruction apparatus 1 according to the present embodiment is output, on the basis of the input instruction file, a material is formed into a thin layer having a normal line in a predetermined axis direction (for example, in the z-axis direction of the orthogonal coordinate system used in the instruction file), and the thin layers are sequentially deposited in the normal line direction to form a three-dimensional object.

Therefor, when the representation space is a polyhedron, the three-dimensional object formation instruction apparatus 1 generates an instruction file by setting the coordinate system so that the 3D printer treats one of the faces of the polyhedral as a bottom face and deposits a plurality of layers in parallel with the bottom face.

However, when a three-dimensional object is formed by an instruction file of such a coordinate system, when the formed three-dimensional object is viewed from the surface in the deposition direction, there may be a slight dispersion between a layer of deposited translucent material (hereinbelow, referred to as a deposited layer) and an adjacent deposited layer, resulting in making the representation body blurring when viewed through the translucent material.

Therefore, according to an example of the present embodiment, when an instruction to form a polyhedral three-dimensional object is output, and the destination of the output is an apparatus which forms a three-dimensional object according to the instruction by depositing a material (for example, 3D printer), the deposition direction may be controlled in a direction different from any of the normal lines of the faces of the representation space. Namely, according to an example of the present embodiment, an instruction to form a three-dimensional object is generated so that the deposition direction is different from the directions of any of the normal lines of the faces of the polyhedral to be formed.

Specifically, according to an example of the present embodiment, when the output destination, i.e., 3D printer, provides a material in a layer having its normal line in the z-axis direction of the representation space and deposits the layers, the three-dimensional object formation instruction apparatus 1 according to the present embodiment, as usual, generates an instruction file by setting the coordinate system so that the 3D printer treats one of the faces of the polyhedral as a bottom face, and deposits a plurality of layers in parallel with the bottom face to form a three-dimensional object.

Figure 7:
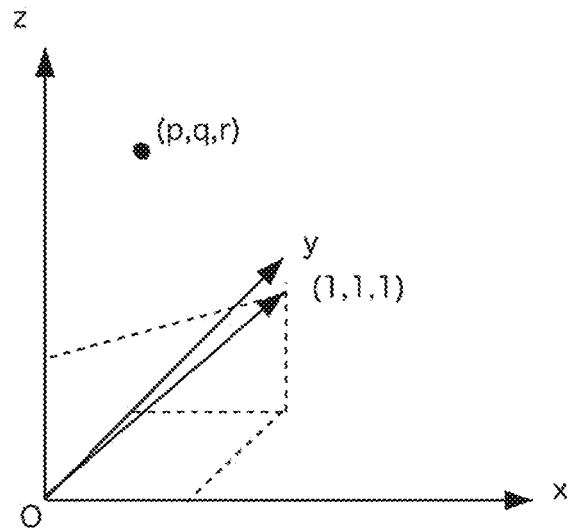
FIG. 7 is an explanatory view showing an example of coordinate transformation by a three-dimensional object formation instruction apparatus according to an embodiment of the present disclosure.
Figure 7:
Figure 7:
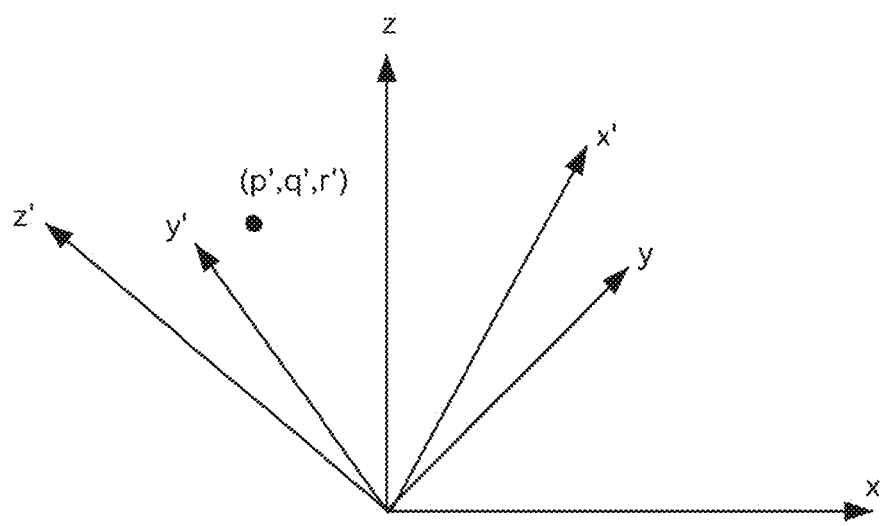

Then, as exemplified in FIG. 7, the three-dimensional object formation instruction apparatus 1 transforms the coordinate information included in the instruction file by rotation so that the direction from the origin (0, 0, 0) to (1, 1, 1) (diagonal direction) in the x, y, z orthogonal coordinate system becomes the deposition direction of the 3D printer (normal line direction of the deposited layer, namely, z-axis in the 3D printer). FIG. 7 shows axes of the original coordinate system after the rotation as (x', y', z'). Therefore, an instruction representing the position (p, q, r) before the rotation is moved to (p', q', r') after the rotation, and according to the instruction file, the 3D printer deposits the material in the z-axis direction after the rotation to form a three-dimensional object. A method for this rotational transformation is widely known, such as a method using rotation matrix, and thus, a detailed explanation therefor is omitted here.

Here, the rotation angle is not limited to the angle exemplified in FIG. 7. The rotation angle may be made different depending on the translucent material to be filled in an area where no objects are arranged. Namely, taking into account the refractive index of the light entering from air to the translucent material, and the refractive index between the adjacent layers of the deposited translucent material, the rotation angle may be selected so that the light entering the three-dimensional object (for example, hexahedron) to be formed reaches the tangible object arranged inside of the three-dimensional object through the smallest number of layers of the translucent material. Also, the rotational angle may be experimentally determined.

The three-dimensional object formation instruction apparatus 1 according to this example of the present embodiment updates the content of the instruction file by transforming each piece of the coordinate information $S(x_m, y_m, z_m)$ ($m=1, 2, \ldots R(i, j, k)$) representing the position where the representation body is to be arranged, included in the instruction file, to a value in a coordinate system rotated by a rotational angle input by a user or determined by a predetermined method, and outputs the updated instruction file.

When the 3D printer forms a three-dimensional object on the basis of the updated instruction file, the deposition direction (normal line direction of the deposited layer) becomes a direction corresponding to the rotational angle, and a step of providing a material in the deposited layer is repeated while the normal line of the deposited layer is, for example, in the diagonal direction, to form a three-dimensional object by deposition of the material.

Accordingly, the representation body enclosed in the translucent material becomes visible from any face of the formed three-dimensional object without crossing any faces (or crossing comparatively few faces) having a slight dispersion.

[Overlap Removal Process]

In the above explanation, the three-dimensional object formation instruction apparatus 1 sets the positions of the representation bodies while preventing the representation bodies from overlapping. However, the three-dimensional object formation instruction apparatus 1 according to the present embodiment may allow overlapping of the representation bodies.

In this case, at a position where a plurality of objects having mutually different colors, such as representation bodies (or a representation body and a background object) having mutually different colors, overlap, the color of the overlapping part (intersection part) is undefined.

Therefore, the three-dimensional object formation instruction apparatus 1 according to the present embodiment may perform the following process. Specifically, the three-dimensional object formation instruction apparatus 1 generates an instruction file by a method mentioned above, and thereafter, performs the following process. Namely, among the objects represented by polygons (hereinbelow, referred to as three-dimensional polygons), included in the instruction file, one unselected three-dimensional polygon is selected. With respect to a combination of this selected three-dimensional polygon with each of the unselected three-dimensional polygons different from the selected three-dimensional polygon, whether or not the pair of three-dimensional polygons have an intersection part (a part occupying the same spatial area) is determined. Then, when it is determined that the intersection part is present, the selected three-dimensional polygon is divided into the intersection part and the remaining part (may be two or more parts).

With respect to the parts obtained by dividing each three-dimensional polygon, the three-dimensional object formation instruction apparatus 1 determines whether or not the part is an intersection part. With respect to the part determined as the intersection part, the intersection part of one of the overlapping three-dimensional polygon is left as it is, and the intersection part of the other three-dimensional polygon is removed. Here, for example, the intersection part of the divided selected three-dimensional polygon is removed.

Thereby, the intersection part of the selected three-dimensional polygon is removed, and the other overlapping three-dimensional polygon is arranged at the intersection part.

The division of the three-dimensional polygon may be performed by a widely known method using a Boolean operation between the three-dimensional polygons, or by obtaining a segment where faces (polygons) of the overlapping three-dimensional polygons intersect and forming a new three-dimensional polygon defined by the obtained segment and the sides of the original polygon.

Further, in order to determine whether or not each part obtained by dividing a certain three-dimensional polygon P is located inside of other three-dimensional polygon (a three-dimensional polygon other than the three-dimensional polygon P), namely, whether or not the part forms an intersection part, a method described in "New Method of Inside Test for Polyhedron", Shinobu NAGASHIMA, Journal of Graphic Science of Japan, Vol. 37, September, 1985, p. 15-19 (https://www.jstage.jst.go.jp/article/jsgs1967/19/2/19_2_15/_pdf) (conveniently, referred to as the area method), or a more simple method for determining crossing number (http://www.nttpc.co.jp/technology/number_algorithm.html) may be adopted.

Here, normally, a comparatively simple crossing number determination method is adopted. Then, if a horizontal line (scanning line) used for the crossing number determination passes through a vertex of any of the three-dimensional polygons, or extends in parallel with any face or any side of any of the three-dimensional polygon, and thus, accurate determination cannot be done by the crossing number determination, the area method may be used.

Thereby, the range where three-dimensional polygons corresponding to the objects of a plurality of colors described in the STL format overlap, can be detected, and can be set in a state that a material of either color is provided thereto.

Further, the part where a plurality of three-dimensional polygons corresponding to objects which should be formed in the same color (material), such as representation bodies (or a representation body and a background object) formed in the same color, overlap, the mutually overlapping plurality of three-dimensional polygons may be replaced with a three-dimensional polygon having a shape of the sum set of these.

Also in this case, the three-dimensional object formation instruction apparatus 1 sequentially selects a three-dimensional polygon; examines whether or not an intersection part is present between the selected three-dimensional polygon and other unselected three-dimensional polygon; when the intersection part is present, divides the selected three-dimensional polygon into the intersection part and the remaining part; and with respect to the three-dimensional polygons overlapping at the intersection part, leaves the intersection part of one three-dimensional polygon as it is, and removes the intersection part the other three-dimensional polygon. Here, the intersection part of the divided, selected three-dimensional polygon is removed. Thereby, a three-dimensional polygon corresponding to the sum set of a pair of three-dimensional polygons can be obtained.

Example Using Voxel

In the above explanation, the instruction included in the instruction file is described in the STL format, but the present embodiment is not limited thereto, and the instruction may be described by voxel.

Effect of Embodiment

According to the present embodiment a physical quantity may be visualized as a three-dimensional object, and a visual representation capable of encouraging physics-based understanding can be formed.

EXAMPLES

[S-Orbital of Helium Atom]

Next, an example of visualizing spatial distribution of existence probability of electrons in the s-orbital of a helium atom will be explained. In this example, an instruction is generated for forming a representation body representing the existence probability of electrons in the s-orbital, and a background object representing the atomic nucleus of helium.

The radial distribution of electrons in the s-orbital of a helium atom can be theoretically obtained, and the radial distribution represents existence probability of electrons corresponding to the distance from the atomic nucleus.

Here, when information (numerical formula of existence probability) representing the existence probability of the s-orbital electron regarding the electrons of the helium atom is input to the three-dimensional object formation instruction apparatus 1, since the existence probability distribution of the electron is a scalar quantity, the three-dimensional object formation instruction apparatus 1 determines the shape of the representation body as "sphere".

Next, the three-dimensional object formation instruction apparatus 1 sets the size of the representation space to the maximum size that the 3D printer, to which the instruction is output, can form.

The existence probability of electrons in the s-orbital of a helium atom is spherically symmetric with the center of the atomic nucleus at the center of symmetry. Thus, the three-dimensional object formation instruction apparatus 1 sets a cube-like representation space with the center of the atomic nucleus at the center, and divides the representation space into a plurality of small spaces $B(i, j, k)$. Here, the small space $B(i, j, k)$ is defined using a polar coordinate system $(r, \theta, \varphi)$ with the center of the representation space (corresponding to the center of the atomic nucleus) at the origin $(r=0)$.

The three-dimensional object formation instruction apparatus 1 specifies an area corresponding to each small space $B(i, j, k)$ in the three-dimensional space represented by the received information, and calculates a statistical value of a physical quantity represented by the received information within the specified area. On the basis of the statistical value, the number $R(i, j, k)$ of the representation bodies in each small space $B(i, j, k)$ is determined as an amount proportional to the statistical value. In this example, a plurality of small spaces B(i, j, k) having the same value of r (namely, located at the same distance from the origin), have the same statistical value of physical quantity (namely, isosurface). Thus, in the small spaces B(i, j, k) located at the same distance from the origin, the same R(i, j, k) pieces of representation bodies are arranged.

The three-dimensional object formation instruction apparatus 1 determines coordinate information S(xm, ym, zm) (m=1, 2, _R(i, j, k)) which represents positions of R(i, j, k) pieces of representation bodies arranged so as not to overlap with each other in the small space B(i, j, k).

Here, the shape of the representation body is determined as "sphere". Thus, an instruction (instruction in the STL format) to arrange R(i, j, k) spheres in each small space B(i, j, k) at random is generated, and the generated instruction is output to the instruction file.

Further, the three-dimensional object formation instruction apparatus 1 includes background object data representing the atomic nucleus, in the obtained instruction file. According to an example of the present embodiment, an instruction to form a spherical object having its center at the center of the representation space, and having a radius larger than the radius of the representation body, is included. At this time, an instruction to forma representation body located at the position overlapping with the background object is deleted.

Further, the three-dimensional object formation instruction apparatus 1 includes an instruction to fill a translucent material in an area where no objects are arranged. This instruction is an instruction to form a shape obtained by removing the predetermined shapes of R(i, j, k) pieces of representation bodies arranged in each small space B (i, j, k) and the shape of the background object arranged at the center of the representation space, from the instruction data of filling the cubic shape representing the entirety of the representation space with the translucent material. Such an instruction can be executed by a process similar to the Boolean operation in so-called 3D modelling, and the process is widely known. Thus, the detailed explanation is omitted here.

Figure 5:
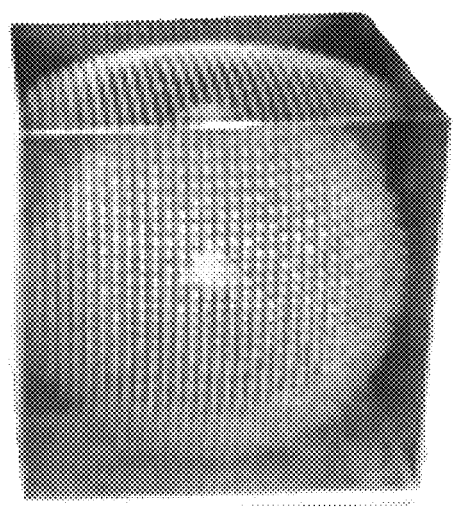
FIG. 5 is an explanatory view showing an example of a three-dimensional object formed on the basis of an instruction generated by a three-dimensional object formation instruction apparatus according to an embodiment of the present disclosure.

The user outputs the obtained instruction file to a 3D printer. Thereby, a three-dimensional object representing the spherically distributed electron existence density is formed. FIG. 5 shows an example of an object formed by the 3D printer on the basis of the formation instruction obtained by the above example, the object visualizing spatial distribution of the existence probability of electrons in the s-orbital of a helium atom.

[Molecular Orbital Method]

Similar to the example of the helium atom, also in case of an approximate solution obtained by a molecular orbital method, information (numerical formula for existence probability of each electron) calculated for existence probability of an electron in a desired molecule (for example, ethylene molecule) by a molecular orbital method (MO), is input to the three-dimensional object formation instruction apparatus 1. Also in this example, the electron existence probability distribution is a scalar quantity, and thus, the three-dimensional object formation instruction apparatus 1 determines the shape of the representation body as "sphere". Here, by way of example, the existence probability of electron is calculated with the midpoint of the C=C bond, i.e., the center of the ethylene molecule, at the origin (0, 0, 0) of the representation space (if this is not satisfied, this setting is done by calculation of parallel translation).

Next, the three-dimensional object formation instruction apparatus 1 sets the size of the representation space to the maximum size that the 3D printer, to which the instruction is output, can form.

In general, the existence probability of electron in the molecule orbit is not spherically symmetric. Thus, in response to a user's instruction, the three-dimensional object formation instruction apparatus 1 sets a cuboid-shaped representation space, and divides the representation space into a plurality of small spaces B(i, j, k). Here, the small space B(i, j, k) is defined by using the orthogonal coordinate system (x, y, z) with the center of the representation space (corresponding to the center of the atomic nucleus) at the origin (r=0).

The three-dimensional object formation instruction apparatus 1 specifies an area corresponding to each small space B(i, j, k) in the three-dimensional space represented by the received information, and calculates a statistical value of physical quantity represented by the received information within the specified area. Then, on the basis of the statistical value, the number R(i, j, k) of the representation bodies in each small space B(i, j, k) is determined as an amount proportional to the statistical value.

The three-dimensional object formation instruction apparatus 1 determines the coordinate information S(xm, ym, zm) (m=1, 2, . . . R(i, j, k)) which represents positions of R(i, j, k) pieces of representation bodies arranged in the small space B(i, j, k) so as not to overlap with each other.

Here, the shape of the representation body is determined as "sphere". Thus, an instruction (instruction in the STL format) to arrange R(i, j, k) spheres in each small space B(i, j, k) at random is generated, and the generated instruction is output to the instruction file.

Further, the three-dimensional object formation instruction apparatus 1 includes background object data representing a molecular skeleton (the atomic nucleus of each atom constituting a molecule or a segment connecting between atomic nuclei (a molecule model usually referred to as a ball-and-stick model)), in the obtained instruction file. According to an example of the present embodiment, an instruction to form a spherical object having a radius larger than the radius of the representation body, at the center of each atom constituting the molecule, is included. At this time, an instruction to form a representation body located at the position overlapping with the background object, is deleted.

Further, the three-dimensional object formation instruction apparatus 1 includes an instruction to fill a translucent material in an area where no objects are arranged. This instruction is an instruction to form a shape obtained by removing the predetermined shapes of R(i, j, k) pieces of representation bodies arranged in each small space B (i, j, k) and the shape of the background object, from the instruction data of filling the cuboid shape representing the entirety of the representation space with the translucent material.

The user outputs the obtained instruction file to a 3D printer. Thereby, a three-dimensional object representing the existence density of the molecule is formed.

At this time, the three-dimensional object formation instruction apparatus 1 may generate a plurality of divisional instruction files cut at an arbitrary plane passing through the representation space. By way of example, in case of an ethylene molecule, two divisional instruction files may be made by cutting at a plain including the line of C=C bond (for example, a plane passing through the center in the Z-axis direction and having its normal line in the Z-axis direction may be set).

The user outputs the obtained divisional instruction files to the 3D printer to form two three-dimensional objects representing the existence densities of electrons. By arranging the obtained two three-dimensional objects so that the surfaces corresponding to the cut plane are matched with each other, the existence probability distribution of electrons in the molecule, such as an ethylene molecule, can be observed. Also, when each three-dimensional object is observed from the surface corresponding to the cut plane, how the electron existence probabilities are distributed around the line of the C=C bond can be observed.

Figure 6A:
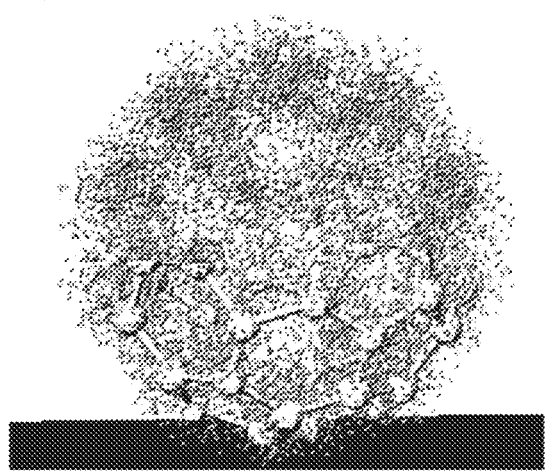
FIG. 6 is an explanatory view of a content example of an instruction generated by a three-dimensional object formation instruction apparatus according to an embodiment of the present disclosure.
Figure 6B:
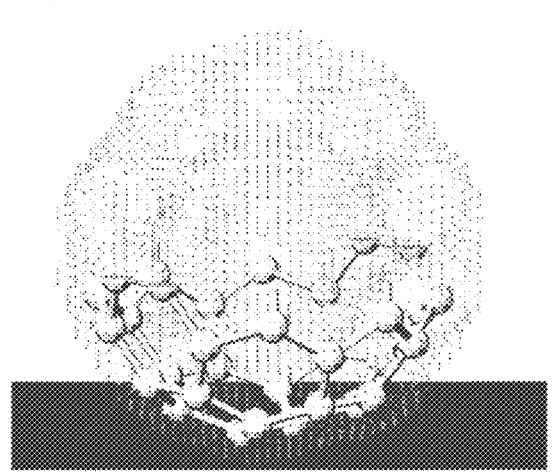

FIG. 6A and FIG. 6B show examples of information represented by instruction files each including an instruction to form a representation body on the basis of the information representing the electron density distribution a fullerene molecule, and an instruction to form a so-called ball-and-stick model as a background object by arranging a sphere at the position of atomic nucleus of each atom, and connecting the covalently bonded atoms with a circular cylinder.

In either of FIG. 6A and FIG. 6B, the ball-and-stick model, i.e., the background object, is limited to the lower half position of the representation space. Thereby, both the distribution state of the atomic nuclei and the electron densities, and the electron density distribution itself, can be easily observed.

FIG. 6A shows an example wherein an instruction to form all representation bodies is included. FIG. 6B shows an example wherein an instruction to form only the representation bodies in the small space included in the isosurface of the value designated by the user, is included. In FIG. 6, the xy plane is indicated below in black, but this portion indicates the bottom part of the representation space, is not formed.

[Wind Due to Landscape]

Next, an example of representing information regarding a wind direction and a wind velocity generated in a mountainous region, as a three-dimensional object is explained. In this example, three-dimensional information of the wind direction and the wind velocity in a certain region is previously obtained. The information may be obtained by using a widely known weather-monitoring method, or a numerical weather prediction. Thus, detailed explanation therefor is omitted here.

The landscape of this region is previously obtained using data for a 3D map, provided by Geospatial Information Authority of Japan, and used as data for a background object.

When the wind direction and wind velocity information at each position in the x, y, z coordinate system is input to the three-dimensional object formation instruction apparatus 1, since the wind direction and wind velocity information is a vector quantity, the three-dimensional object formation instruction apparatus 1 determines the shape of the representation body as "circular cone shape".

Next, the three-dimensional object formation instruction apparatus 1 sets the size of the representation space to the maximum size that the 3D printer, to which the instruction is output, can form.

The three-dimensional object formation instruction apparatus 1 sets a cube-like representation space, and divides the representation space into a plurality of small spaces $B(i, j, k)$. Here, the small space $B(i, j, k)$ is defined using the x, y, z orthogonal coordinate system.

The three-dimensional object formation instruction apparatus 1 specifies an area corresponding to each small space $B(i, j, k)$ in the three-dimensional space represented by the received information, and calculates a statistical value of physical quantity represented by the received information within the specified area. Specifically, an average of the wind direction and wind velocity information in the areas corresponding to the small spaces $B(i, j, k)$ in the three-dimensional space represented by the received information. The average can be obtained by calculating the average of each component of the vector quantity representing the wind direction and the wind velocity.

On the basis of the statistical value, the three-dimensional object formation instruction apparatus 1 determines the direction (direction from the center of the circular bottom face toward the vertex), and the length (length from the bottom face to the vertex) of a circular cone, which is a representation body in each small space $B(i, j, k)$, as amounts proportional to the statistical value. In this example, the direction of the circular cone is determined to be the wind direction, and the length of the circular cone is determined to be proportional to the wind velocity.

With respect to each small space $B(i, j, k)$, the three-dimensional object formation instruction apparatus 1 generates an instruction (instruction in the STL format) to arrange a circular cone having a length determined by the above method, in the direction determined by the above method, at the center of the small space $B(i, j, k)$, and outputs the generated instruction to the instruction file.

Further, the three-dimensional object formation instruction apparatus 1 includes background object data representing the landscape in the obtained instruction file. According to an example of the present embodiment, the background object data is subjected to parallel translation, rotation, or scaling, so that the x, y, z coordinates of the landscape match the x, y, z coordinates of the wind direction and wind velocity information. This process is widely known, and thus, a detailed explanation therefor is omitted here. Further, at this time, the instruction to form a representation body at a position overlapping with the background object, is deleted.

Further, the three-dimensional object formation instruction apparatus 1 includes an instruction to fill a translucent material in an area where no objects are arranged. This instruction is an instruction to form a shape obtained by removing the predetermined shape of the representation body arranged in each small space $B(i, j, k)$ and the shape of the background object, from the instruction data of filling the cubic shape representing the entirety of the representation space with the translucent material. Such an instruction can be executed by a process similar to the Boolean operation in so-called 3D modelling, and the process is widely known. Thus, the detailed explanation is omitted here.

The user outputs the obtained instruction file to the 3D printer. Thereby, a three-dimensional object representing the wind direction and the wind velocity at a location having a certain landscape can be formed.

[Hypocenter Model]

Further, an example of a hypocenter model is explained. In the present example, at least the position information (latitude, longitude, and depth) of the hypocenter regarding each earthquake occurred in a certain region (within a latitude and longitude range), in a predetermined period, is previously obtained. Further, the maximum seismic intensity or the magnitude value representing the scale of the earthquake may also be obtained for each earthquake.

In addition, the landscape of this region may be obtained using data for a 3D map, provided by Geospatial Information Authority of Japan, and used as data for a background object. The plane data representing the ground surface may be used as data for a background object. Further, there may be no data for a background object.

The position information of the hypocenter is input to the three-dimensional object formation instruction apparatus 1 as each position in the x (for example, latitude), y (for example, longitude), z (depth) coordinate system. At this time, information of each point representing the position of an earthquake may be treated as, for example, point information, and the three-dimensional object formation instruction apparatus 1 determines the shape of the representation body as "sphere" (or a regular tetrahedron, in case of point information).

Next, the three-dimensional object formation instruction apparatus 1 sets the size of the representation space to the maximum size that the 3D printer, to which the instruction is output, can form.

The three-dimensional object formation instruction apparatus 1 sets a cube-like representation space, and divides the representation space into a plurality of small spaces $B(i, j, k)$. Here, the small space $B(i, j, k)$ is defined by using the x, y, z orthogonal coordinate system.

The three-dimensional object formation instruction apparatus 1 specifies the position corresponding to each small space $B(i, j, k)$ in the three-dimensional space represented by the received information, and calculates the number (cumulative value) of earthquakes in the small space within the specified area on the basis of the received information.

On the basis of the cumulative value, the three-dimensional object formation instruction apparatus 1 determines the size of a sphere, i.e., a representation body, having the center at each small space $B(i, j, k)$, as an amount proportional to the cumulative value. In the present example, it may be determined that the larger the cumulative value, the larger the radius of the sphere.

The three-dimensional object formation instruction apparatus 1 generates an instruction (instruction in the STL format) to arrange a sphere having the size determined by the above method, for each small space $B(i, j, k)$, with the center of the sphere located at the small space $B(i, j, k)$, and outputs the generated instruction to the instruction file.

Further, if there is background object data, the three-dimensional object formation instruction apparatus 1 includes the background object data in the obtained instruction file. According to an example of the present embodiment, the background object data is subjected to parallel translation, rotation, or scaling, so that the x, y, z coordinates of the landscape match the x, y, z coordinates of the hypocenter information. This process is widely known, and thus, the detailed explanation therefor is omitted here. Also, at this time, an instruction to form a representation body at a position overlapping with the background object, is deleted.

Further, the three-dimensional object formation instruction apparatus 1 includes an instruction to fill a translucent material in an area where no objects are arranged. This instruction is an instruction to form a shape obtained by removing the predetermined shape of the representation body arranged in each small space $B(i, j, k)$ and the shape of the background object, from the instruction data of filling the cubic shape representing the entirety of the representation space with the translucent material. Such an instruction can be executed by a process similar to the Boolean operation in so-called 3D modelling, and the process is widely known. Thus, the detailed explanation is omitted here.

The user outputs the obtained instruction file to the 3D printer. Thereby, a three-dimensional object representing the three-dimensional position of the hypocenter in the certain region can be formed.

In addition, when the magnitude of each earthquake is also input, the radius of the sphere may be determined on the basis of the magnitude. In this case, if a plurality of hypocenters are present in the small space $B(i, j, k)$, the radius of the sphere may be determined on the basis of the maximum magnitude among them, or the radius of the sphere may be determined on the basis of the average of the magnitudes.

Further, the three-dimensional object formation instruction apparatus 1 of the present example may receive an input of a focal mechanism solution for each earthquake, and in response, may indicate the principal tension axis and the principal pressure axis of each earthquake. In this case, the physical quantity is an amount representing a plane, and thus, the three-dimensional object formation instruction apparatus 1 determines the shape of the representation body as two "planes" (intersecting at the position of the hypocenter).

Other Examples

The examples recited above are merely examples, and may be others, such as a distribution of stars in the Galaxy, etc., energy fluctuation in vacuum at the time of Big Bang, a distribution of dark matter, a distribution of dust in the cosmic space such as Saturn's ring, and the like. The background object may represent an astral body such as a planet in the solar system, a comet, etc.

Explanation on Numerals

1 three-dimensional object formation instruction apparatus, 11 control unit, 12 memory unit, 13 operation unit, 14 display unit, 15 input-output unit, 21 receiving unit, 22 shape determination unit, 23 position determination unit, 24 instruction generation unit, 25 output unit

The invention claimed is:

1. A three-dimensional object formation instruction apparatus, which visualizes a distribution of a physical quantity in a three-dimensional space, comprising:
   a receiving device which receives information pertaining to the distribution of physical quantity in the three-dimensional space,
   a shape determination device which determines a shape of representation bodies representing the physical quantity, on the basis of the received information,
   a position determination device which divides the three-dimensional space into a plurality of divided spaces, and determines the number of the representation bodies to be arranged and a position of each of the representation bodies, in each of the plurality of divided spaces, on the basis of the received information, and
   a generating device which generates a three-dimensional object formation instruction including an instruction to form a three-dimensional object, which comprises the representation bodies having the determined shape at the determined position, so that physical quantity visualizing means visualizes the distribution of physical quantity in a three-dimensional space.

2. The three-dimensional object formation instruction apparatus according to claim 1, wherein
   the shape determination device determines whether the information pertaining to the distribution of physical quantity is scalar or vector, and determines the shape of the representation—bodies based on the determination whether the information pertaining to the distribution of physical quantity is scalar or vector.

3. The three-dimensional object formation instruction apparatus according to claim 1, wherein
the position determination device sets the plurality of divided spaces within a three-dimensional representation space corresponding to at least a part of the three-dimensional space, calculates an arrangement density of the representation bodies for each of the plurality of divided spaces on the basis of the received information pertaining to the distribution of the physical quantity, and sets arrangement positions of the representation bodies in each of the divided spaces, and the determined number of the representation bodies corresponding to the calculated arrangement density.

4. The three-dimensional object formation instruction apparatus according to claim 1, wherein
the position determination device determines each of the positions of the representation body bodies within a three-dimensional representation space corresponding to at least part of the three-dimensional space, and
the apparatus further comprises an instruction generating device which generates an instruction to fill a translucent material in another part of the three-dimensional area—where no representation body is arranged.

5. The three-dimensional object formation instruction apparatus according to claim 1, wherein
the generating device generating the three-dimensional object formation instruction outputs an instruction to form a polyhedral three-dimensional object, and when formation of the three-dimensional object on the basis of the output instruction is performed by an apparatus which forms the three-dimensional object by material deposition, the three-dimensional object formation instruction is generated so that a deposition direction is different from a normal line direction of any of faces of a polyhedron to be formed.

6. The three-dimensional object formation instruction apparatus according to claim 1, wherein
the information pertaining to the distribution of the physical quantity is information of electron density distribution calculated for an atom or a molecule.

7. The three-dimensional object formation instruction apparatus according to claim 1, wherein
the information pertaining to the distribution of the physical quantity is information relating to distribution of electrical flux lines or magnetic field lines.

8. The three-dimensional object formation instruction apparatus according to claim 1, wherein
the information pertaining to the distribution of the physical quantity is information relating to flow rate distribution of a fluid.

9. The three-dimensional object formation instruction apparatus according to claim 1 wherein
the three-dimensional object formation instruction apparatus further receives information pertaining to a shape of one or more of tangible objects to be arranged in the three-dimensional space, and
the generating device generating the three-dimensional object formation instruction further includes an instruction to form the one or more of tangible objects having a relevant shape on the basis of the received information pertaining to the shape of the one or more of tangible objects.

10. The three-dimensional object formation instruction apparatus according to claim 9, wherein
the generating device generating a three-dimensional object formation instruction detects an overlapping part, in the three-dimensional space, where the tangible objects to be formed according to the instruction included in the three-dimensional object formation instruction, overlap with each other, and controls the formation so that either one of the overlapping tangible objects is to be formed at the overlapping part.

11. A three-dimensional object production method comprising steps of:
referring to information pertaining to distribution of physical quantity in a three-dimensional space,
determining a shape of representation bodies representing the physical quantity, on the basis of the information referred to,
dividing the three-dimensional space into a plurality of divided spaces,
determining the number of representation bodies to be arranged and a position of each of the representation bodies, in each of the plurality of divided spaces, on the basis of the information referred to,
generating a three-dimensional object formation instruction which includes an instruction to form a three-dimensional object, which comprises the representation bodies having the determined shape at the determined position, and
forming the three-dimensional object on the basis of the three-dimensional object formation instruction so as to visualize the distribution of physical quantity in a three-dimensional space.

12. A non-transitory computer readable medium storing a program which makes a computer function as:
a receiving device which receives information pertaining to distribution of physical quantity in the three-dimensional space,
a shape determination device which determines a shape of representation bodies representing the physical quantity, on the basis of the received information,
a position determination device which divides the three-dimensional space into a plurality of divided spaces, and determines the number of the representation bodies to be arranged and a position of each of the representation bodies, in each of the plurality of divided spaces, on the basis of the received information, and
a generating device which generates a three-dimensional object formation instruction including an instruction for forming a three-dimensional object, which comprises the determined number of the representation bodies, each of the representation bodies having the determined shape at the determined position so as to visualize the distribution of physical quantity in the three-dimensional space.

13. A three-dimensional object formation instruction apparatus, which visualizes distribution of a quantity in a three-dimensional space, comprising:
a receiving device which receives information pertaining to the distribution of the quantity in the three-dimensional space,
a shape determination device which determines whether the information of the quantity is scalar or vector, and determines a shape of representation bodies based on the determination whether the information of the quantity is scalar or vector, wherein the shape of the representation bodies is pre-determined regardless of the distribution of the quantity, a position determination device which determines positions where the representation bodies are arranged, on the basis of the received information, a generating device which generates a three-dimensional object formation instruction including an instruction to form an object, which is represented by the representation bodies formed at the determined positions, so that physical quantity visualizing means visualizes the distribution of the physical quantity in a three-dimensional space.

* * * * *